(12) United States Patent
Simpson

(10) Patent No.: US 11,155,490 B1
(45) Date of Patent: Oct. 26, 2021

(54) SUPEROMNIPHOBIC THIN FILM

(71) Applicant: Waymo LLC, Mountain View, CA (US)

(72) Inventor: John T. Simpson, Sahuarita, AZ (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/855,303

(22) Filed: Apr. 22, 2020

(51) Int. Cl.
| | |
|---|---|
| *B32B 15/04* | (2006.01) |
| *C03C 17/00* | (2006.01) |
| *C03C 3/089* | (2006.01) |
| *C01B 33/158* | (2006.01) |
| *C03C 17/23* | (2006.01) |

(52) U.S. Cl.
CPC ........ *C03C 17/006* (2013.01); *C01B 33/1585* (2013.01); *C03C 3/089* (2013.01); *C03C 17/23* (2013.01); *C01P 2004/64* (2013.01); *C03C 2217/213* (2013.01); *C03C 2217/228* (2013.01); *C03C 2217/425* (2013.01); *C03C 2217/76* (2013.01); *C03C 2217/91* (2013.01)

(58) Field of Classification Search
CPC .......... C03C 2217/425; C03C 2217/91; C03C 2217/76
USPC ................................................ 428/212, 426
See application file for complete search history.

(56) References Cited

U.S. PATENT DOCUMENTS

| | | | |
|---|---|---|---|
| 4,042,359 A | 8/1977 | Schnabel et al. | |
| 6,770,584 B2 * | 8/2004 | Barney | C04B 14/064 264/640 |
| 7,211,605 B2 | 5/2007 | Coronado et al. | |
| 7,258,731 B2 | 8/2007 | D'Urso et al. | |
| 7,553,514 B2 | 6/2009 | Fan et al. | |
| 8,298,622 B2 | 10/2012 | Nakayama et al. | |
| 8,509,669 B2 | 8/2013 | Moorlag et al. | |
| 8,658,243 B2 | 2/2014 | Yamada et al. | |
| 8,741,158 B2 | 6/2014 | Aytug et al. | |

(Continued)

FOREIGN PATENT DOCUMENTS

| | | |
|---|---|---|
| CN | 103922351 | 7/2014 |
| CN | 107254237 | 10/2017 |

(Continued)

OTHER PUBLICATIONS

Aytug et al., "Optically Transparent, Mechanically Durable, Nanostructured Superhydrophobic Surfaces Enabled by Spinodally Phase-Separated Glass Thin Films," Nanotechnology 24(31):315602 (Jul. 15, 2013).

(Continued)

*Primary Examiner* — Lauren R Colgan
(74) *Attorney, Agent, or Firm* — McDonnell Boehnen Hulbert & Berghoff LLP

(57) ABSTRACT

An article including an optically transparent, superomniphobic coating that is durable and relatively easy to keep clean, is disclosed. In one aspect, the present disclosure provides an article comprising a substrate and a graded layer, the graded layer having a first side disposed adjacent the substrate, the first side comprising 45-85 wt. % silicon oxide in a first glass phase and 10-40 wt. % boron oxide in a second glass phase, and opposed the first side, a second side comprising at least 45 wt. % silicon oxide, no more than 5 wt. % boron oxide, and 10-50 wt. % aerogel, the aerogel present in the graded layer as a plurality of distinct domains.

17 Claims, 1 Drawing Sheet

(56) References Cited

U.S. PATENT DOCUMENTS

| | | | |
|---|---|---|---|
| 9,221,076 B2* | 12/2015 | Simpson | B32B 3/10 |
| 9,308,501 B2 | 4/2016 | Hu et al. | |
| 9,334,404 B2 | 5/2016 | Simpson et al. | |
| 9,517,969 B2* | 12/2016 | Koketsu | G02B 5/3008 |
| 9,546,299 B2* | 1/2017 | Gesford | C09D 5/1662 |
| 10,155,688 B2 | 12/2018 | Simpson | |
| 10,787,586 B2* | 9/2020 | Simpson | C03C 17/3405 |
| 2009/0042469 A1 | 2/2009 | Simpson | |
| 2012/0088066 A1* | 4/2012 | Aytug | C03C 17/34 428/141 |
| 2012/0088092 A1* | 4/2012 | Simpson | B05D 5/08 428/323 |
| 2013/0186139 A1 | 7/2013 | Tanii | |
| 2013/0236695 A1 | 9/2013 | Aytug et al. | |
| 2014/0155522 A1* | 6/2014 | Simpson | C09D 127/22 523/400 |
| 2014/0287243 A1 | 9/2014 | Weber et al. | |
| 2015/0239773 A1* | 8/2015 | Aytug | C03C 11/005 428/312.6 |
| 2015/0240123 A1 | 8/2015 | Kissel et al. | |
| 2016/0130449 A1 | 5/2016 | Kissel et al. | |
| 2016/0296985 A1* | 10/2016 | Dhiman | B05D 5/083 |
| 2018/0171469 A1 | 6/2018 | Aytug | |
| 2019/0023830 A1* | 1/2019 | Nowak | C08G 18/5015 |
| 2019/0264058 A1 | 8/2019 | Simpson | |

FOREIGN PATENT DOCUMENTS

| | | |
|---|---|---|
| JP | 2006151800 | 6/2006 |
| JP | 5024886 | 9/2012 |
| WO | 2011/001036 | 1/2011 |
| WO | 2012/115986 | 8/2012 |
| WO | 2012/121677 | 9/2012 |
| WO | 2014/035742 | 3/2014 |

OTHER PUBLICATIONS

Aytug, "Atomically Bonded Transparent Superhydrophobic Coatings," Oak Ridge National Lab (ORNL) No. ORNL/TM-2015/197 (Aug. 1, 2015).

Junyan et al., "Durable superhydrophobic/highly oleophobic coatings from multi-dome $SiO_2$ nanoparticles and fluoroacrylate block copolymers on flat substrates," Journal of Materials Chemistry A 3:20134-44 (Jul. 27, 2015).

Simpson et al., "Superhydrophobic materials and coatings: a review," Reports on Progress in Physics 78(8):086501 (Jul. 16, 2015).

Yang et al., "Facile preparation of super-hydrophobic and super-oleophilic silica film on stainless steel mesh via sol-gel process," Applied Surface Science 256(13):4095-102 (Apr. 15, 2010).

International Searching Authority, International Search Report and Written Opinion dated Jul. 22, 2021, issued in connection with International Patent Application No. PCT/US2021/026596, filed on Apr. 9, 2021, 11 pages.

* cited by examiner

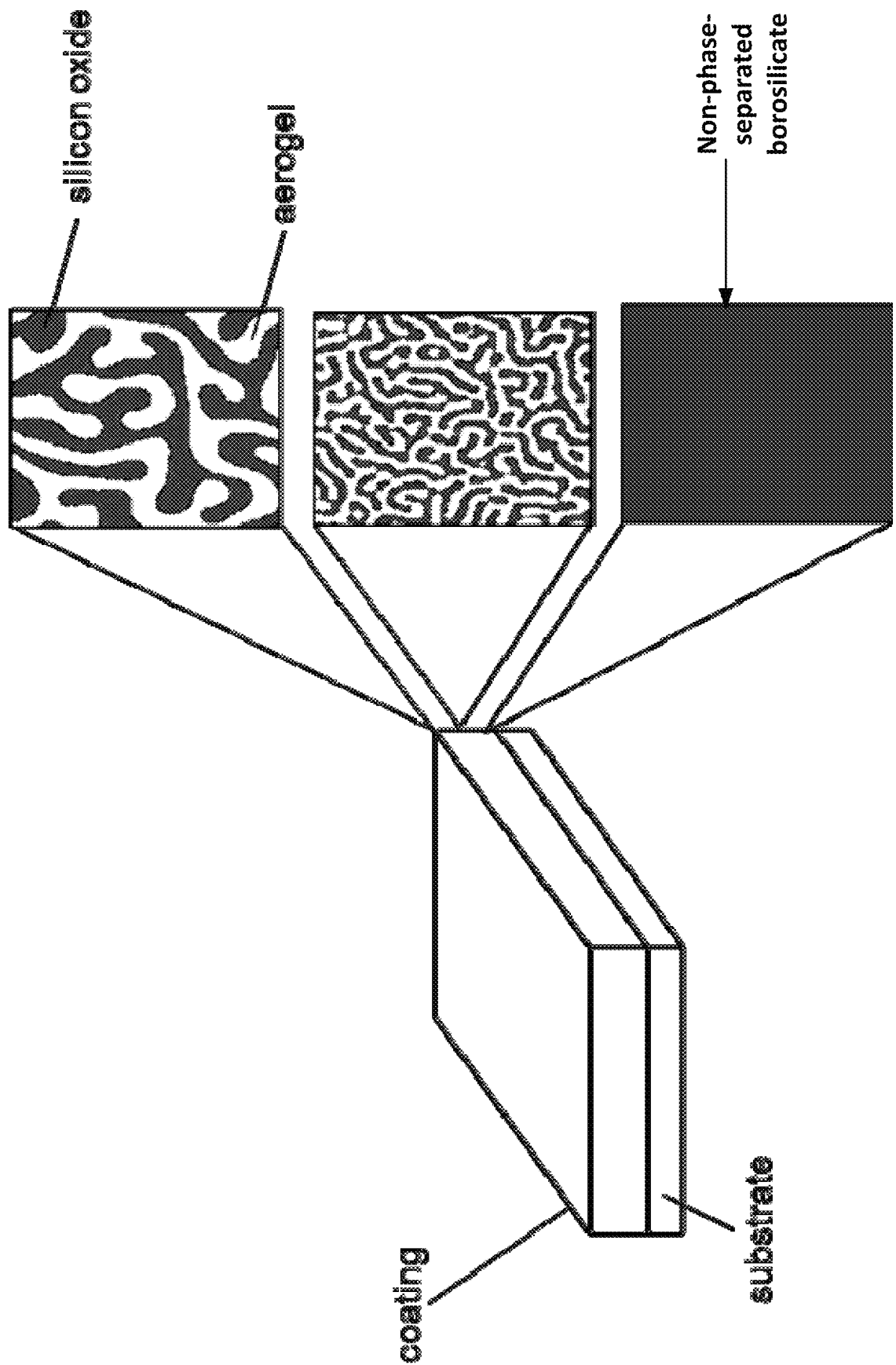

SUPEROMNIPHOBIC THIN FILM

BACKGROUND

Unless otherwise indicated herein, the materials described in this section are not prior art to the claims in this application and are not admitted to be prior art by inclusion in this section.

Superhydrophobic coatings having exceptional water repellency properties have potential application in numerous fields of endeavor. However, such surfaces and coatings can be poorly repellant to oily material (i.e., low oleophobicity), such as road grime (e.g., in automotive applications). Though superomniphobic materials having exceptional water and oil repellency properties have been achieved, conventional superomniphobic materials have micron-scale roughness, and accordingly can be difficult to keep clean (e.g., from "bug splats"). Moreover, such materials are often susceptible to shear force, which can remove some of the surface texturing (e.g., nano-texturing and/or micro-texturing).

Additionally, conventional superomniphobic materials are of limited use as coatings in optical applications. The micron-scale roughness noted above tends to scatter light and makes optical clarity difficult to achieve. Typically, thin films of such materials are only transparent to a narrow range of wavelengths (e.g., visible-range light, or even a portion thereof). And because materials with high optical clarity tend to have low surface roughness, typical optical substrates have a very smooth surface that can limit strong bonding to a superomniphobic coating.

Accordingly, there remains a need for optically transparent, superomniphobic coatings that are durable and relatively easy to keep clean.

SUMMARY

In one aspect, the present disclosure provides an article comprising a substrate and a graded layer having a first side disposed adjacent the substrate, the first side comprising 45-85 wt. % silicon oxide in a first glass phase and 10-40 wt. % boron oxide in a second glass phase, and opposite the first side, a second side comprising at least 45 wt. % silicon oxide, no more than 5 wt. % boron oxide, and 10-50 wt. % aerogel, the aerogel present in the graded layer as a plurality of distinct domains.

In certain embodiments as otherwise described herein, the graded layer comprises a silane, the silane present in the layer at an interface of at least a portion of the aerogel domains and the silicon oxide.

In certain embodiments as otherwise described herein, the silane is covalently linked to the silicon oxide.

In certain embodiments as otherwise described herein, the aerogel comprises aerogel nanoparticles.

In certain embodiments as otherwise described herein, the aerogel nanoparticles have an average size within the range of 10 nm to 90 nm.

In certain embodiments as otherwise described herein, the graded layer has a thickness within the range of 400 nm to 1 μm.

In certain embodiments as otherwise described herein, the graded layer has a graded index of refraction from, at the second side, an ambient index of refraction to, at the first side, an index of refraction of the substrate.

In certain embodiments as otherwise described herein, the second side of the graded layer has a water contact angle of at least 130°.

In certain embodiments as otherwise described herein, the second side of the graded layer has an oil contact angle of at least 60°.

In certain embodiments as otherwise described herein, the graded layer has a light transmissivity of at least 98% for wavelengths between 400 nm and 1,500 nm.

In certain embodiments as otherwise described herein, the substrate comprises borosilicate glass.

In certain embodiments as otherwise described herein, the graded layer comprises an inner region adjacent the substrate, a middle region adjacent the inner region, and an outer region adjacent the middle region and the second side. The inner region is substantially free of aerogel. The middle region comprises a first plurality of aerogel domains, wherein the average size of the domains increases along a gradient from the inner region to the outer region. The outer region comprises a second plurality of aerogel domains.

In certain embodiments as otherwise described herein, the inner region comprises at least 80 wt. % of a non-phase-separated borosilicate glass.

In certain embodiments as otherwise described herein, at least about 80 wt. % of the silicon oxide present in the outer region comprises amorphous silica.

In certain embodiments as otherwise described herein, the average size of the second plurality of aerogel domains is within the range of 50 nm to 180 nm.

In certain embodiments as otherwise described herein, the average size of the first plurality of aerogel domains increases along the gradient from less than 25 nm, to 50 to 180 nm.

In certain embodiments as otherwise described herein, the inner region has a thickness of less than 250 nm, the middle region has a thickness within the range of 250 nm to 750 nm, and the outer region has a thickness of less than 250 nm.

In another aspect, the present disclosure provides a method for preparing an article, comprising: providing a porous layer disposed on a substrate, the porous layer having a substantially non-porous first side adjacent the substrate, the first side comprising 45-85 wt. % silicon oxide in a first glass phase and 10-40 wt. % boron oxide in a second glass phase, and opposite the first side, a second side comprising at least 45 wt. % silicon oxide, no more than 5 wt. % boron oxide, and having pores with a porosity within the range of 10-40 vol. %; and disposing aerogel in at least a portion of the pores of the porous layer.

In certain embodiments as otherwise described herein, disposing aerogel comprises forming a sol-gel in at least a portion of the pores of the porous layer and drying the sol-gel to form an aerogel.

In certain embodiments as otherwise described herein, disposing aerogel comprises disposing a suspension of aerogel nanoparticles in at least a portion of the pores of the porous layer and drying the suspension.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1 depicts a graded layer disposed on a substrate, according to one embodiment of the disclosure. The graded layer includes an outer region (top) that has larger aerogel domains, a middle region (middle) that has smaller aerogel domains, and an inner region (bottom) of non-phase-separated borosilicate glass adjacent the substrate.

DETAILED DESCRIPTION

The following detailed description describes various features and functions of the disclosed methods, compositions, and structures. The illustrative embodiments described herein are not meant to be limiting. It will be readily understood that certain aspects of the disclosed methods, compositions, and structures can be arranged and combined in a wide variety of different configurations, all of which are contemplated herein.

An article including an optically transparent, superomniphobic coating that is durable and relatively easy to keep clean, is described. To achieve such a coating, aerogel particles, which can be hydro- and oleo-phobic and have significant compressive strength, can be disposed as discrete domains within a coating layer (e.g., derived from borosilicate glass) to improve the omniphobicity and durability of the coating. And the particles, disposed within the coating, are advantageously protected from shear forces.

"Superhydrophobic," as used herein, describes surfaces or coatings that have a water contact angle of at least about 130°. Also as used herein, "superoleophobic" describes surfaces or coatings that have an oil contact angle of at least about 60°. And as used herein, "superomniphobic" describes surfaces or coatings that have a water contact angle of at least about 130° and an oil contact angle of at least about 60°. Also as used herein, an "optically transparent" coating transmits at least about 90% of incident light (e.g., having a wavelength in the range of 400-1,500 nm).

In one aspect, the present disclosure provides an article comprising a substrate and a graded layer, the graded layer having a first side disposed adjacent the substrate, the first side comprising 45-85 wt. % silicon oxide in a first glass phase and 10-40 wt. % boron oxide in a second glass phase, and opposite the first side, a second side comprising at least 45 wt. % silicon oxide, no more than 5 wt. % boron oxide, and 10-50 wt. % aerogel, the aerogel present in the graded layer as a plurality of distinct domains.

As used herein, "oxide" describes oxides in all forms and crystalline phases. For example, "silicon oxide" includes $SiO_2$, $SiO_x$ where x is within the range of 1 to 3, etc. Unless otherwise indicated, regardless of the actual stoichiometry of the oxide, oxides are calculated as the most stable oxide for purposes of weight percent determinations. For example, the person of ordinary skill in the art will appreciate that a non-stoichiometric oxide of silicon, or even another form of silicon, may still be calculated as $SiO_2$. As used herein, "aerogel domains," "aerogel present as a domain," etc., can be used interchangeably and describe a discrete moiety comprising at least 50 wt. % (e.g., at least 75 wt. %, or at least 90 wt. %, or at least 95 wt. %) aerogel. Of course, aerogel domains can include other components such as, for example, binders, aerogel precursors, impurities, etc.

In certain embodiments as otherwise described herein, the first side comprises 45-75 wt. %, or 45-65 wt. %, or 55-85 wt. %, or 65-85 wt. %, or 55-65 wt. %, or 65-75 wt. % silicon oxide, and 10-30 wt. %, or 10-20 wt. %, or 20-40 wt. %, or 30-40 wt. %, or 20-30 wt. % boron oxide. In certain embodiments as otherwise described herein, the second side comprises at least 55 wt. %, or at least 65 wt. %, or at least 75 wt. %, or at least 85 wt. %, or at least 95 wt. % silicon oxide, and no more than 4 wt. %, or no more than 3 wt. %, or no more than 2 wt. %, or no more than 1 wt. % boron oxide.

In certain embodiments as otherwise described herein, the average domain size (e.g., the average minor dimension, or the average diameter) of the aerogel domains of the second side is 50-180 nm, or 50-150 nm, or 50-120 nm, or 50-90 nm, or 80-180 nm, or 110-180 nm, or 140-180 nm, or 70-160 nm, or 70-140 nm, or 70-120 nm.

In certain embodiments as otherwise described herein, the graded layer has a thickness of up to 1 µm. For example, in certain embodiments, the graded layer has a thickness of 300-900 nm, or 300-800 nm, or 300-700 nm, or 300-600 nm, or 400 nm-1 µm, or 500 nm-1 µm, or 400-900 nm, or 400-800 nm, or 500-700 nm.

In certain embodiments, the second side of the graded layer has a water contact angle of at least 130°, or at least 140°, or at least 150°. In certain such embodiments, the second side of the graded layer has an oil contact angle of at least 60°, or at least 65°, or at least 70°.

Advantageously, the graded layer as otherwise described herein can comprise a graded index of refraction from, at the second side of the graded layer, an ambient index of refraction to, at the first side, an index of refraction of the substrate. Accordingly, the graded layer can desirably have a light transmissivity of at least 98% (e.g., at least 99% or at least 99.5%) for wavelengths between 400 nm and 1,500 nm.

In certain embodiments as otherwise described herein, the graded layer comprises a silane, the silane present in the layer at an interface of at least a portion of the aerogel domains and the silicon oxide. In certain such embodiments, the silane includes one or more compounds selected from organosilanes, fluorinated silanes, and disilazanes. In certain embodiments as otherwise described herein, the silane is covalently linked to the silicon oxide. For example, in certain such embodiments, the silane layer is the product of treating a porous layer with one or more compounds selected from organosilanes, fluorinated silanes, and disilazanes, and then disposing aerogel in at least a portion of the pores of the layer.

Suitable organosilanes include, but are not limited to alkylchlorosilanes; alkoxysilanes, e.g., methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, butyltrimethoxysilane, butyltriethoxysilane, hexyltrimethoxysilane, octyltrimethoxysilane, 3-mercaptopropyltrimethoxysilane, n-octyltriethoxysilane, phenyltriethoxysilane, and polytriethoxysilane; trialkoxyarylsilanes; isooctyltrimethoxy-silane; N-(3-triethoxysilylpropyl)methoxyethoxyethyl carbamate; N-(3-triethoxysilylpropyl)methoxyethoxyethyl carbamate; polydialkylsiloxanes including, e.g., polydimethylsiloxane; arylsilanes including, e.g., substituted and unsubstituted arylsilanes; alkylsilanes including, e.g., substituted and unsubstituted alkyl silanes including, e.g., methoxy and hydroxy substituted alkyl silanes; and combinations thereof. Suitable alkylchlorosilanes include, for example, methyltrichlorosilane, dimethyldichlorosilane, trimethylchlorosilane, octylmethyldichlorosilane, octyltrichlorosilane, octadecylmethyldichlorosilane and octadecyltrichlorosilane. Other suitable materials include, for example, methylmethoxysilanes such as methyltrimethoxysilane, dimethyldimethoxysilane and trimethylmethoxysilane; methylethoxysilanes such as methyltriethoxysilane, dimethyldiethoxysilane and trimethylethoxysilane; methylacetoxysilanes such as methyltriacetoxysilane, dimethyldiacetoxysilane and trimethylacetoxysilane; vinylsilanes such as vinyltrichlorosilane, vinylmethyldichlorosilane, vinyldimethylchlorosilane, vinyltrimethoxysilane, vinylmethyldimethoxysilane, vinyldimethylmethoxysilane, vinyltriethoxysilane, vinyl methyldiethoxysilane and vinyldimethylethoxysilane.

Suitable fluorinated silanes include fluorinated alkyl-, alkoxy-, aryl- and/or alkylaryl-silanes, and fully perfluorinated alkyl-, alkoxy-, aryl- and/or alkylaryl-silanes. An example of a suitable fluorinated alkoxy-silane is perfluorooctyltrimethoxysilane.

Suitable disilazanes include, for example, hexamethyldisilazane, divinyltetramethyldisilazane and bis(3,3-trifluoropropyl)tetramethyldisilazane. Cyclosilazanes are also suitable, and include, for example, octamethylcyclotetrasilazane.

In certain embodiments as otherwise described herein, the aerogel comprises aerogel nanoparticles. In certain desirable embodiments, aerogel nanoparticles are very high surface area (600-800 m$^2$/g) particles with a density between about 100 and 200 kg/m$^3$ and an average particle size of about 200 nm or less. The average aerogel nanoparticle size represents an average linear dimension of the particles (e.g., an average diameter in the case of substantially spherical particles), and it may represent an average grain or crystallite size, or, in the case of agglomerated particles, an average agglomerate size. In some embodiments, the average aerogel nanoparticle size may be less than about 100 nm, less than about 75 nm, or less than about 50 nm. For example, in certain embodiments as otherwise described herein, the aerogel nanoparticles have an average size of 10-90 nm, or 10-80 nm, or 10-70 nm, or 10-60 nm, or 20-90 nm, or 30-90 nm, or 40-90 nm, or 50-90 nm, or 20-40 nm, or 30-50 nm, or 40-60 nm, or 50-70 nm, or 60-80 nm.

In certain embodiments, the aerogel nanoparticles may be obtained by processing precursor powder to reduce the average particle size to about 100 nm or smaller. The aerogel nanoparticles may include nanoscale surface asperities, i.e., a nanoscale surface texture characterized by protruding or sharp features separated by recessed features and/or pores at the particle surface. As the person of ordinary skill in the art would appreciate, the scale of the surface texture is smaller than the average size of the particle; generally, surface asperities are at least about 50% smaller. For example, aerogel particles of about 100 nm in average particle size may include surface asperities of about 25 nm in average size or less, and hydrophobic particles of about 50 nm in average particle size may include surface asperities of about 25 nm in size or less.

Suitable aerogel precursor powders are commercially available from a number of sources, including Cabot Corp. (Boston, Mass.). Suitable aerogel precursor powders are sold under the Nanogel® Aerogel, LUMIRA® Aerogel and ENOVA® Aerogel trade names, and include, for example ENOVA™ Aerogel IC 3110, ENOVA™ Aerogel MT 1100, ENOVA™ Aerogel MT 1200, ENOVA™ Aerogel IC 3120. These porous, nanostructured particles are available in particle sizes ranging from about 5 microns to 4 mm, but may be mechanically milled or sonicated as discussed below to obtain particles of reduced sizes (e.g., 10-90 nm) suitable for the graded layer as otherwise described herein.

In certain embodiments, the aerogel domains of the graded layer are the product of disposing a suspension of aerogel nanoparticles (e.g., as otherwise described herein) in at least a portion of the pores of a porous layer, and then drying the suspension. In other embodiments, the aerogel domains of the graded layer are the product of forming a sol-gel in the pores of a porous layer, and then drying the sol-gel to form an aerogel.

In certain embodiments as otherwise described herein, the substrate is an optical substrate. For example, in certain embodiments, the substrate is optically transparent glass. In certain embodiments as otherwise described herein, the substrate comprises borosilicate glass having a light transmissivity of at least 95% for wavelengths between 700 nm and 1,500 nm.

In certain embodiments as otherwise described herein, the graded layer comprises an inner region adjacent the substrate, the inner region being substantially free of aerogel, a middle region adjacent the inner region, the middle region comprising a first plurality of aerogel domains, and an outer region adjacent the middle region and the second side of the layer, the outer region comprising a second plurality of aerogel domains (see, e.g., FIG. 1). In certain such embodiments, the average domain size (e.g., the average minor dimension, or the average diameter) of the first plurality increases along a gradient from the inner region (e.g, having an effective domain size of about 0) to the outer region (e.g., having an average domain size of 50-180 nm).

As used herein, a "gradient" includes at least a first value at a first position and, at a second position, a second value different from the first. For example, over a size gradient from the inner region to the outer region, the size of aerogel domains may increase continuously (e.g., linearly, exponentially, etc.) from the first value (e.g., about 0) to the second value (e.g., about 180 nm).

In certain embodiments as otherwise described herein, the inner region of the graded layer comprises at least 80 wt. % (e.g., at least 90 wt. %, or at least 95 wt. %, or at least 99 wt. %) of a borosilicate glass (e.g., an alkali-borosilicate glass). In certain embodiments as otherwise described herein, at least 80 wt. % (e.g., at least 90 wt. %, or at least 95 wt. %, or at least 99 wt. %) of the silicon oxide present in the outer region comprises amorphous silica.

In certain embodiments as otherwise described herein, the inner region of the graded layer comprises less than 2 wt. % (e.g., less than 1.5 wt. %, or less than 0.5 wt. %, or less than 0.1 wt. %) of aerogel. For example, in certain embodiments as otherwise described herein, the inner region comprises at least 95% wt. % (e.g., at least 97.5 wt. %, or at least 99 wt. %) of an alkali-borosilicate glass, and includes no more than 2 wt. % (e.g. 0-1.5 wt. %, or 0-0.5 wt. %, or 0-0.1 wt. %) of a combined amount of aerogel and amorphous silica. In certain embodiments as otherwise described herein, the inner region has a thickness of less than 250 nm, or less than 150 nm, or less than 100 nm, or less than 50 nm, or 10-150 nm, or 10-100 nm, or 10-50 nm.

In certain embodiments as otherwise described herein, the middle region of the graded layer comprises 20-90 wt. % (e.g., 40-80 wt. %, or 60-80 wt. %) of a combined amount of aerogel and silicon oxide. For example, in certain embodiments as otherwise described herein, the middle region comprises 10-80 wt. % (e.g., 20-60 wt. %, or 20-40 wt. %) of an alkali-borosilicate glass, and includes 20-90 wt. % (e.g., 40-80 wt. %, or 60-80 wt. %) of a combined amount of aerogel and amorphous silica. In certain embodiments as otherwise described herein, the average domain size (e.g., the average minor dimension, or the average diameter) of the first plurality of aerogel domains increases along a gradient from the inner region to the outer region, from less than 25 nm (e.g., less than 15 nm, or less than 5 nm) to 50-180 nm (e.g., 70-160 nm, or 70-140 nm). In certain embodiments as otherwise described herein, the middle region has a thickness of 250-750 nm, or 250-650 nm, or 250-550 nm, or 250-450 nm, or 350-750 nm, or 450-750 nm, or 550-750 nm, or 300-500 nm, or 350-550 nm, or 400-600 nm, or 450-650 nm, or 500-700 nm.

In certain embodiments as otherwise described herein, the outer region of the graded layer comprises at least 80 wt. % (e.g., at least 90 wt. %, or at least 95 wt. %, or 90-99 wt. %) of a combined amount of aerogel and silicon oxide. For example, in certain embodiments as otherwise described herein, the outer region comprises no more than 20 wt. % (e.g., no more than 10 wt. %, or no more than 5 wt. %) of an alkali-borosilicate glass, and includes at least 80 wt. % (e.g., at least 90 wt. %, or at least 95 wt. %, or 90-99 wt. %) of a combined amount of aerogel and amorphous silica. In certain embodiments as otherwise described herein, the average domain size (e.g., the average minor dimension, or the average diameter) of the second plurality of aerogel domains is 50-180 nm, or 50-150 nm, or 50-120 nm, or 50-90 nm, or 80-180 nm, or 110-180 nm, or 140-180 nm, or 70-160 nm, or 70-140 nm, or 70-120 nm. In certain embodiments as otherwise described herein, the outer region has a thickness of less than 250 nm, or less than 150 nm, or less than 100 nm, or less than 50 nm, or 10-150 nm, or 10-100 nm, or 10-50 nm.

Another aspect of the disclosure is a method for preparing an article (e.g., as described herein) comprising providing a porous layer disposed on a substrate, the porous layer having a substantially non-porous first side adjacent the substrate, the first side comprising 45-85 wt. % silicon oxide in a first glass phase and 10-40 wt. % boron oxide in a second glass phase, and opposite the first side, a second side comprising at least 45 wt. % silicon oxide, no more than 5 wt. % boron oxide, and having pores with a porosity within the range of 10-40 vol. %, and disposing aerogel in at least a portion of the pores of the porous layer.

In certain embodiments as otherwise described herein, the first side of the porous layer comprises 45-75 wt. %, or 45-65 wt. %, or 55-85 wt. %, or 65-85 wt. %, or 55-65 wt. %, or 65-75 wt. % silicon oxide, and 10-30 wt. %, or 10-20 wt. %, or 20-40 wt. %, or 30-40 wt. %, or 20-30 wt. % boron oxide. In certain embodiments as otherwise described herein, the second side comprises at least 55 wt. %, or at least 65 wt. %, or at least 75 wt. %, or at least 85 wt. %, or at least 95 wt. % silicon oxide, and no more than 4 wt. %, or no more than 3 wt. %, or no more than 2 wt. %, or no more than 1 wt. % boron oxide.

In certain embodiments as otherwise described herein, the second side of the porous layer has a porosity of 10-30 vol. %, or 10-20 vol. %, or 20-40 vol. %, or 30-40 vol. %, or 20-30 vol. %. In certain embodiments as otherwise described herein, the average pore size (e.g., the average minor dimension, or the average diameter) of the second side is 50-180 nm, or 50-150 nm, or 50-120 nm, or 50-90 nm, or 80-180 nm, or 110-180 nm, or 140-180 nm, or 70-160 nm, or 70-140 nm, or 70-120 nm. In certain embodiments as otherwise described herein, providing the porous layer includes spinodal decomposition of a borosilicate glass (e.g., an alkali-borosilicate glass) into phase-separated boron oxide domains (e.g., alkali borate domains) and silicon oxide domains (e.g., amorphous silica domains), followed by selective removal of at least a portion (e.g., substantially all) of the boron oxide domains (e.g., by etching). In other embodiments, providing the porous layer comprises removing aerogel (e.g., damaged or dirty aerogel) from an article as otherwise described herein. The properties of the various components can be as otherwise described above with respect to the articles of the disclosure.

In certain embodiments as otherwise described herein, disposing aerogel comprises forming a sol-gel in at least a portion of the pores of the porous layer, and drying the sol-gel to form an aerogel. For example, in certain embodiments as otherwise described herein, disposing aerogel comprises reacting a silicon alkoxide (e.g., tetramethoxysilane, tetraethoxysilane) and water in the presence of a catalyst (e.g., ammonium hydroxide, ammonium fluoride) in the pores of the porous layer to form a sol-gel, and then drying (e.g., by supercritical solvent extraction) the sol-gel to form an aerogel disposed in the pores of the layer.

In other such embodiments, disposing aerogel comprises disposing a suspension of aerogel nanoparticles (e.g., as otherwise described herein) in at least a portion of the pores of the porous layer, and then drying the suspension.

The invention claimed is:

1. An article comprising
   a substrate; and
   a graded layer having
      a first side disposed adjacent the substrate, the first side comprising 45-85 wt. % silicon oxide in a first glass phase and 10-40 wt. % boron oxide in a second glass phase, and
      opposite the first side, a second side comprising at least 45 wt. % silicon oxide, no more than 5 wt. % boron oxide, and 10-50 wt. % aerogel, the aerogel present in the graded layer as a plurality of distinct domains.

2. The article of claim 1, wherein the graded layer comprises a silane, the silane present in the layer at an interface of at least a portion of the aerogel domains and the silicon oxide.

3. The article of claim 2, wherein the silane is covalently linked to the silicon oxide.

4. The article of claim 1, wherein the aerogel comprises aerogel nanoparticles.

5. The article of claim 4, wherein the aerogel nanoparticles have an average size within the range of 10 nm to 90 nm.

6. The article of claim 1, wherein the graded layer has a thickness within the range of 400 nm to 1 μm.

7. The article of claim 1, wherein the graded layer has a graded index of refraction from, at the second side, an ambient index of refraction to, at the first side, an index of refraction of the substrate.

8. The article of claim 1, wherein the second side of the graded layer has a water contact angle of at least 130°.

9. The article of claim 1, wherein the second side of the graded layer has an oil contact angle of at least 60°.

10. The article of claim 1, wherein the graded layer has a light transmissivity of at least 98% for wavelengths between 400 nm and 1,500 nm.

11. The article of claim 1, wherein the substrate comprises borosilicate glass.

12. The article of claim 1, wherein the graded layer comprises an inner region adjacent the substrate, a middle region adjacent the inner region, and an outer region adjacent the middle region and the second side; and wherein
   the inner region is substantially free of aerogel;
   the middle region comprises a first plurality of aerogel domains, wherein the average size of the domains increases along a gradient from the inner region to the outer region; and
   the outer region comprises a second plurality of aerogel domains.

13. The article of claim 12, wherein the inner region comprises at least 80 wt. % of a non-phase-separated borosilicate glass.

14. The article of claim 12, wherein at least about 80 wt. % of the silicon oxide present in the outer region comprises amorphous silica.

15. The article of claim 12, wherein the average size of the second plurality of aerogel domains is within the range of 50 nm to 180 nm.

16. The article of claim 12, wherein the average size of the first plurality of aerogel domains increases along the gradient from less than 25 nm, to 50 to 180 nm.

17. The article of claim 12, wherein
   the inner region has a thickness of less than 250 nm;
   the middle region has a thickness within the range of 250 nm to 750 nm; and
   the outer region has a thickness of less than 250 nm.

\* \* \* \* \*